United States Patent [19]

Romberg et al.

[11] Patent Number: 4,882,210

[45] Date of Patent: Nov. 21, 1989

[54] GLASS CONTAINER

[75] Inventors: Val G. Romberg, Upper Darby; Patty H. Kiang, Collegeville; Wayne T. Curry, Pottstown; Ralph E. Pfister, Wayne, all of Pa.

[73] Assignee: The West Company, Phoenixville, Pa.

[21] Appl. No.: 248,935

[22] Filed: Sep. 26, 1988

[51] Int. Cl.⁴ .................. B65D 23/00; B32B 17/06
[52] U.S. Cl. .................... 428/34.7; 215/12.2; 215/355; 215/DIG. 6; 220/454; 220/455; 428/336; 428/426; 428/441
[58] Field of Search ............. 428/34.7, 441, 426, 428/500, 336; 215/DIG. 6, 1 C, 12.2, 355; 220/454, 455

[56] References Cited

U.S. PATENT DOCUMENTS

| | | | |
|---|---|---|---|
| 3,288,728 | 11/1966 | Gorman | 528/125 |
| 3,352,754 | 9/1967 | Gorman | 528/396 |
| 3,415,673 | 12/1968 | Clock | 427/195 |
| 3,717,495 | 2/1973 | Paoletti et al. | 215/DIG. 6 |
| 3,772,061 | 11/1973 | McCoy et al. | 215/1 R |
| 4,098,934 | 7/1978 | Brockway | 215/DIG. 6 |
| 4,225,647 | 9/1980 | Parent | 428/35.7 |

Primary Examiner—Ellis P. Robinson
Assistant Examiner—James J. Seidleck
Attorney, Agent, or Firm—Eugene E. Renz

[57] ABSTRACT

A container for use with a closure and a glass container having an access opening for a closure. The container was a crush strength increasing polyparaxylylene coating on at least one side of the glass container at a thickness of at least 0.1 microns to give at least 40% increased crush strength.

10 Claims, No Drawings

GLASS CONTAINER

FIELD OF THE INVENTION

This invention relates to glass containers which are suitable for use with a closure such as a stopper. More particularly, the invention relates to an improved glass container which has an access opening for a stopper and which possesses superior strength and decreased extractable inorganics.

BACKGROUND OF THE INVENTION

For many years, the most successful closure system for phamaceutical produces has been the use of elastomeric stoppers in glass vials. The glass and rubber combination has been useful for a wide variety of pharmaceutical ingredients, combining both safe storage of the medicine and easy access through the rubber stopper. Particularly when liquids are contained in the vial, a needle can easily penetrate the rubber stopper to withdraw the desired amount of ingredient without otherwise interfering with the integrity of the closure. Even when powders are stored in such containers, the elastomeric closure can be penetrated with a needle to activate the powder by adding liquid such as pure water. The activated medicine remains in a safe protected environment.

Because of the success of these types of phamaceutical closure devices and as more and more systems have been using rubber stoppers in glass containers, the rate at which these devices can be assembled contributes greatly to the economic efficiencies of this otherwise desirable component design. For example, conventional pharmaceutical devices which are used for filling vials rely on a mechanical implantation of the rubber stopper into the neck of the vial or other shaped container. Often times the vial contains an expensive pharmaceutical produce and for that reason it is necessary to ensure that a completely affective seal is achieved when a stopper is implanted. The implantation process is accomplished by mechanical insertion and the application of a significant amount of pressure in a vertical direction along the axis of the vial. Stoppers are inserted into vials at pressures in excess of 60 lbs. In order to ensure that the rubber stopper is quickly and thoroughly inserted into the neck of the vial. At the same time that the rubber is inserted, many systems include the use of an aluminum seal on the stopper in order to permanently complete the closure process. During this final step, when the aluminum seal is placed on the stopper, significant pressure is directly applied to the glass vial. The crush strength of the glass vial becomes particularly important. Breakage of the vial during this step is particularly expensive since the contents have already been added to the vial and often times profitability of the product line can be lost if there is any significant breakage. At the same time, pressures cannot be reduced since the same loss of profitability occurs if the seal is not effective. Increasing the strength of the glass is also uneconomical because the amount of glass necessary for a 40 to 50% increase in strength for all of the vials being filled is not cost effective.

Another concern which has become more important in recent years, particularly in the pharmaceutical industry, is the concern over the mount of extractable metals and other materials which may be extracted from glass containers to thereby contaminate the otherwise pharmaceutically pure ingredients contained in the container. When glass containers are used for other less sensitive materials, extractables are not a major concern.

Accordingly, it would be a great advantage of the pharmaceutical industry and to other industries which use glass bottles if the crush strength of glass bottles could be increased significantly, such as by 40 to 50% or more. If this were to be accomplished, significant savings could be realized by the elimination of broken containers during the manufacturing process, thereby avoiding the loss of expensive ingredients. Moreover, more effective seals can be achieved through the use of increased force without concern for damage. Also, economics can be achieved by the use of slightly less glass since that glass which is used will have a significantly increased strength. Other advantages and objects will appear hereinafter.

SUMMARY OF THE INVENTION

It has now been discovered that the above and other objects of the present invention can be accomplished in the following manner. Specifically, an improved glass container has been discovered which is admirably suited for use with a closure such as a rubber stopper. The container comprises a glass container having an access opening for a closure and a paraxylylene coating on at least one side of said glass container, so that the thickness of the coating is at least about 0.1 micron in thickness. Preferably, the coating is on the inside of the glass container to prevent extractables from being removed from the glass into the contents of the container. Alternatively, the outside or both sides of the glass container can be coated with the paraxylylene coating. A preferred range is from about one-half micron to about 5 microns, with a most preferred range of about 1 to about 3 microns in thickness. The container of the present invention is admirably suited for use with a rubber stopper in the manufacture of pharmaceutical drug containers and closures. Nevertheless, the present invention is admirably suited for any glass container which would benefit from having an increase in crush strength of at least 40 to 50%.

DETAILED DESCRIPTION OF THE PREFERRED EMBODIMENT

The containers of this invention may be manufactured from any conventional glass material which has been used to contain materials. Glass which has been formed into vials, bottles, jars and the like, is adapted to be used with a closure, such as a rubber stopper or other closure which is fitted by force into the opening of the container, and as such the glass container has a certain degree of crush strength or ability to withstand forces applied during the closure step without crushing or otherwise being damaged. Reference is made herein to the pharmaceutical industry because the contents of glass containers in the pharmaceutical industry are extremely expensive and there is a need to rapidly fill large quantities of containers in order to obtain moderate processing costs and to obviate the financial burden on the patients being treated. Nevertheless, the present invention is admirably suitable for any glass container which is subjected to the crushing force, such as during capping or filling or stacking, and accordingly, it is intended that the invention be understood in this broader scope encompassing all forms of glass containers.

As noted above, the present invention relates to the use of a particular coating on glass containers so as to significantly increase the crush strength of the glass container. This coating materials is generally defined as being a paraxylylene coating or polymer. Gorham U.S. Pat. No. 3,288,728 discloses a basic method of preparing linear copolymers from paraxylylenes using temperature conditions between 450° C. and 700° C. This patent suggests that small articles can be protected or encapsulated with these polymers to obtain insulative and protective properties of the polyparaxylylenes. The reference generally suggests that there are enumerable possible applications for the polymer as a coating mineral.

Gorham U.S. Pat. No. 3,342,754 describes the broad method of preparing linear polymers of paraxylylene and particularly in preparing coatings using that material. The patent is repleat with a variety of examples of variations and suggests that these polymers are desirable for use as a film, fiber, surface coating or electrical insulation. Both this patent and the previous Gorham patent offers the general suggestion that almost any material may be coated with the paraxylylene polymers, although neither has a specific example relating to glass containers and particularly glass containers for the pharmaceutical industry.

U.S. Pat. No. 3,379,803 describes particular apparatus and methods useful for polymerizing paraxylylene. General disclosures using this material indicate that a thin yet continuous film may be prepared on a wide variety of substraights. A related patent, U.S. Pat. No. 3,472,795 describes an additional method for increasing the coating thickness.

U.S. Pat. No. 4,225,647 discloses a process for coating an extremely broad list of materials with polymers of paraxylylene. The coating of articles may range from less than 50 angstroms to as thick as 5 mils or more. This patent suggests that a first layer of substituted compounds can be employed prior to the polyparaxylylene coating.

Finally, Gorham et al U.S. Pat. No. 3,300,332 describes a coating process wherein the object of the process is to coat with an insoluble coating. The thickness of the coating is not described in detail but the reference suggests that the thickness of the polymeric coating is not narrowly critical but is dictated by the end use of the product. He describes a coating of 0.1 mil as being very thin and useful when desiring resistance to solvent or reactive attack.

Presently available glass products are admirably suited for the purpose in the pharmaceutical industry, except for the expense involved when one or more of the small glass vials or other glass containers are crushed during high speed filling and capping steps. Accordingly, the present inventions seeks to improve the glass containers functionality in terms of compression or crushing strength while maintaining its functionality in all of the remaining areas. The paraxylylene coatings which are contemplated by the present invention accomplish that task, forming an inner and impervious coating which prevents the extraction of undesirable components of glass into highly sensitive pharmaceutical preparations. What has not been heretofore known, however, is that these same polyparaxylyene coatings significantly contribute to the reduction of losses via breakage of the glass during the filling and capping operation.

The various paraxylylenes may be applied as a coating in the manner which has been described previously in the various patents discussed hereinabove. Specifically, as an example of various paraxylylene polymers and paraxylylene copolymers, the previously referenced Gorham U.S. Pat. Nos. 3,342,754 and 3,288,728 describe the chemistry of the polymers and copolymers which may be employed as coatings in the present invention. U.S. Pat. Nos. 3,379,803 and 3,472,795 describe suitable methods for applying these particular polymers and copolymers onto a wide variety of materials. Such methods are admirably suited for the present invention for applying polymers and copolymers of paraxylylene on the glass containers of the present invention. The term polyparaxylylene is intended to include both polymers and copolymers of the various paraxylylenes which are described in the prior art. As has been stated above, the coatings are applied to the glass container so as to provide a coating having a thickness of at least 0.5 microns and normally ranging from about 0.5 to about 5 microns. A preferred range is 1 to 3 microns in thickness.

Normally, the coating is applied to the interior of the container in order to obtain the inherent benefits of polyparaxylylene resistance to solvent attack and the like. These coatings are almost always completely compatible with the contents of these containers. Alternatively, of course, the coating can be on the outside of the container. Additionally, the entire glass container can be coated so that both the inside and outside of the glass container are covered with the strength increasing layer.

In order to demonstrate the efficacy of the present invention, the following experiments were performed. In each case, a conventional glass container which is currently in use in a variety of applications in the pharmaceutical industry was employed.

In the first set of experiments, the crush strength of various 5 ml vials were tested. One micron coatings of a polyparaxylylene polymer were applied to a number of 5 ml vials. An equal number of uncoated vials were evaluated for comparative purposes. Ten uncoated 5 ml glass vials were crushed on an Instron crusher. The average crush strength measured was 302 lbs of force. Ten vials coated with a 1 micron coating were also crushed on the Instron, with an average crush strength of 430 lbs. The coatings according to the present invention resulted in a 42% increase in crush strength. The percent breakage of a 5ml vial run in an assembly process in which 50 lbs of pressure is used to insert a stopper results in a 0.5 percent breakage rate for uncoated vials and a 0.1 percent breakage rate for the coated samples. This results in a 500% improvement in the manufacturing process. In procedures where expensive pharmaceutical materials are at risk, a fixed fold decrease in product breakage represents a substantial and surprising improvement in performance and a significant savings.

A series of experiments were performed to determine the resistance of glass containers according to the present invention to extraction of glass components. Sixteen coated and uncoated dental cartridges were autoclaved for one hour in 100 ml of 0.001M HCl. The water was then analyzed for cation, anion, and aluminum concentrations. Presented below in Table I are the results of those analysis.

TABLE I

| | Extractables, Micrograms | |
|---|---|---|
| Element/Compound | Uncoated Glass Container | Coated Container |
| Sodium Ion | 9.9 | Less than 1.0 |
| Fluorine Ion | 5.4 | Less than 0.5 |
| Nitrate Ion | 0.5 | Less than 0.1 |
| Sulfate Ion | 1.5 | Less than 0.5 |
| Aluminum | 1.9 | Less than 0.5 |

As can been seen from the data presented in Table I above, the present invention is admirably suited for protecting the components of glass containers from contamination by extractable materials. This benefit is achieved in addition to the surprising results demonstrated by extremely thin coatings which result in significant and surprising increases in crush strength.

In order to demonstrate this surprising strength property, another series of experiments were performed. In this series of experiments, groups of 10 identical glass vials were coated with varying amounts of a paraxylylene coating. Each of these 10 glass container samples were then crushed on an Instron crush strength device. The results are presented below in Table II,

TABLE II

| | Crush Strength | |
|---|---|---|
| Coating Thickness, Microns | Average Crush Strength, Pounds | Percent Increase |
| 0.0 | 325 | 0 |
| 0.1 | 490 | 51 |
| 0.5 | 485 | 49 |
| 1 | 545 | 68 |
| 2 | 485 | 49 |
| 5 | 500 | 54 |

As can be seen from the data presented above, even extremely thin coatings of 0.1 microns provide an amazing increase in the strength of the glass container. This result is truly surprising and unexpected. A variety of pharmaceutical products may be used in the container having the coating of the present invention. Specifically, pharmaceutical products containing medicine and veterinarian drugs, distilled water, solvents containing medicines, syrups, serums and the like are uneffected when packaged with a container according to the present invention.

What is claimed is:

1. A container for use with a closure, comprising a glass container having an access opening for a closure and a crush strength increasing polyparaxylylene coating on at least one side of said glass container at a thickness of at least 0.1 to about 5 microns.

2. The container of claim 1, wherein said coating is on the inside of said container.

3. The container of claim 1, wherein said coating is on both sides of the container.

4. The coating of claim 1, wherein said coating thickness ranges from 0.5 to 5.0 microns.

5. The container of claim 4, wherein said coating thickness ranges from 1 to 3 microns.

6. The container of claim 1, wherein said closure is a rubber stopper.

7. A container for use with a closure, comprising a glass container having an access opening for a closure and a crush strength increasing polyparaxylylene coating on the inside of glass container in a thickness of from about 0.5 to about 5 microns.

8. The container of claim 7, wherein said coating is on both sides of said container.

9. The container of claim 7, wherein said coating thickness ranges from about 1 to about 3 microns.

10. The container of claim 7, wherein said closure is a rubber stopper.

* * * * *